Patented May 18, 1948

2,441,555

UNITED STATES PATENT OFFICE 2,441,555

MIXED ESTERS OF POLYHYDRIC ALCOHOLS

Robert H. Barth, Ridgewood, and Harry Burrell, Paramus, N. J., assignors to Heyden Chemical Corporation, New York, N. Y., a corporation of Delaware No Drawing. Application October 12, 1943, Serial No. 505,944

9 Claims. (Cl. 260—410.6)

This invention relates to esters of pentaerythritol and related compounds useful in the plastics and coatings arts as modifiers, and this application is a continuation in part of our copending application Serial No. 378,052, filed February 8, 1941, which has issued as Patent No. 2,356,745.

It is an object of the invention to prepare substances compatible with a wide variety of resins and cellulose derivatives and which serve to plasticize, soften, elasticize, lubricate, and otherwise modify these plastics. The resulting compositions may be molded under pressure, dissolved in solvents to form coating compositions, extruded to form ribbons, fibers, or structural shapes, emulsified or otherwise prepared to be used as textile assistants, and so forth.

The esters of this invention may be used with cellulose nitrate, cellulose acetate, cellulose acetobutyrate and other cellulose esters, ethyl cellulose, methyl cellulose, benzyl cellulose and other cellulose ethers, damar, manila, rosin, ester gum, and other natural resins, polystyrene, polyvinyl esters and acetals, chlorinated rubber, phenol-formaldehyde, urea- and melamine-formaldehyde, and other synthetic resins, castor oil, triacetin, tricresyl phosphate, dibutyl phthalate and other plasticizers, if necessary, and with or without such solvents, pigments or fillers, as may be desirable.

The plasticizers may be incorporated with these ingredients according to methods well known in the art, as, for example, by dissolving in a mutual solvent and subsequently evaporating the solvent, by kneading at an elevated temperature, if desired, and conveniently in a machine of the Banbury mixer type, by milling on differential rolls, and so forth.

The acetate and the propionate of pentaerythritol have been described in the literature and are not claimed as coming within the scope of this invention. Because these materials are solids, because they are water-sensitive, and for other reasons, their use has been limited. We have found, however, that certain other esters and classes of esters are highly desirable as modifying agents, and these will be pointed out, and other objects of the invention will be indicated.

In the manufacture of pentaerythritol by the condensation of acetaldehyde and formaldehyde, in addition to the pentaerythritol itself, smaller amounts of related hydroxylated substances are also obtained. One of these, which is obtained in a considerable amount, is dipentaerythritol, which is an ether having the following structure:

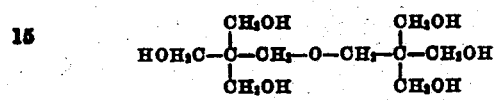

(see Brün, "Ueber den Dipentaerythrit," Wilhelm Greven, Krefeld, 1930). Another related hydroxylated substance, which is obtained in somewhat smaller amounts, is white and crystalline, melts at 230–240° C., and has a hydroxyl content of 33%. It contains 46.5 per cent carbon and 9.15 per cent hydrogen; the remainder may be presumed to be oxygen. It is a mixture of chemical entities, and contains tripentaerythritol as well as other related compounds the exact formulae of which have not been determined. It is related to dipentaerythritol in that it contains pentaerythritol residues bound by ether linkages. For purposes of definition in this specification and in the claims, this substance will be termed "pleopentaerythritol." The term is not intended to indicate that the substance is formed either actually or theoretically by combination of pentaerythritol residues, but merely signifies that it is probably a product similar to pentaerythritol and dipentaerythritol.

When the material referred to as "pleopentaerythritol" is crystallized from 100 times its weight of water, crude tripentaerythritol is obtained. When this crude product is recrystallized twice from water, a pure tripentaerythritol is obtained, which has a melting point of 242-248° C., and the following analysis.

|  | Per cent Calculated | Per cent Found |
| --- | --- | --- |
| Carbon | 48.35 | 47.97 |
| Hydrogen | 8.66 | 8.20 |

The formula of tripentaerythritol would be as follows:

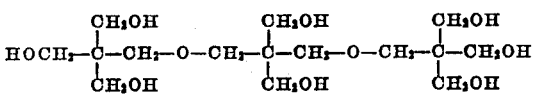

Tripentaerythritol reacts with formaldehyde in the presence of aqueous hydrochloric acid to give a compound, having a melting point of 176–178° C., which corresponds to the following formula and has the following analysis:

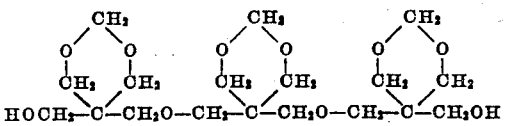

|  | Per cent Calculated | Per cent Found |
| --- | --- | --- |
| Carbon | 52.90 | 54.3 |
| Hydrogen | 7.90 | 7.0 |
| Molecular Weight | 408.4 | 413 |

Dipentaerythritol, tripentaerythritol, and pleopentaerythritol, together with other polymers of pentaerythritol, may be grouped together under the generic term "polypentaerythritols."

In carrying out our invention we may also use compounds of higher molecular weight than pentaerythritol, which are formed either actually or theoretically by etherifying one or more of the hydroxyl groups of pentaerythritol with a polyhydric alcohol. These compounds, therefore, have either the same number of hydroxyl groups as pentaerythritol (as for instance when an ether is formed between pentaerythritol and a glycol, or with pentaerythritol and ethylene oxide); or they may have a greater number of hydroxyl groups than pentaerythritol, that is to say, five or more, as for instance when an ether is formed between two or more molecules of pentaerythritol, or between glycerol, etc., and pentaerythritol.

Esters of pentaerythritol and the polypentaerythritols, such as mixed esters, hydroxy esters, and acetal-esters, may be conveniently prepared according to the methods illustrated in the examples.

This invention is particularly concerned with mixed esters of pentaerythritol, polypentaerythritols and mixtures thereof, which are compatible with organic plastic materials and which have the property of lubricating the said plastic material when incorporated therewith during a fabrication operation. Such esters consist of one or two long-chain fatty acid radicals per molecule and two or more short-chain fatty acid radicals in the same molecule. Such fatty acid radicals exert lubricating properties, and the short-chain fatty acid radicals control the compatibility with the plastic material. For example, pentaerythritol triacetate monostearate is compatible with cellulose acetate and lubricates this material. Such lubricating plasticizers have the great advantage over lubricants used in the prior art in that they are compatible with the plastic or film-forming materials. Previously, materials such as zinc stearate or calcium stearate, paraffin wax, montan wax, carnauba wax, stearic acid, and the like have been used to lubricate molding compositions. Such materials are undesirable because they are not truly compatible with the materials with which they are incorporated, and usually result in cloudy or opaque or translucent compositions. The materials of this invention may be incorporated in substantial amounts in such plastic materials as cellulose derivatives, vinyl resins, polystyrene, and similar transparent plastic materials without deleteriously affecting the transparency of such materials.

Among the fatty acids suitable for providing the long-chain fatty acid radicals are those fatty acids having 10 or more carbon atoms per molecule. These fatty acids are preferably saturated or only slightly unsaturated, as, for example, those fatty acids containing not more than two double bonds per molecule. Specific suitable fatty acids include lauric, myristic, palmitic, stearic, behenic, arachidic, oleic, ricinoleic, and similar and related fatty acids. Mixtures of such fatty acids, for instance those which occur naturally by saponifying non-drying oils or fats, may be used, and such mixtures may also contain small amounts of higher unsaturated fatty acids without departing from the scope of this invention. For instance, soy bean oil fatty acid may be used. Such fatty acids may also have attached dissimilar groups or radicals such as hydroxyl, keto, aldehyde, halide, amino or amide groups.

The esterifying short-chain fatty acids should preferably contain five or fewer carbon atoms per chain, and include formic, acetic, propionic, butyric, and valeric acids. Branch-chain acids and dibasic acids may also be used; in the case of dibasic or polybasic acids, it is desirable to esterify all but one of the carboxyl groups with a monohydric alcohol.

Such mixed fatty acid esters may be used in accordance with any of the methods already known to the art. They may be incorporated directly in the molding composition or film-forming lacquer, usually to the extent of from 0.1% to 5%, and preferably about 1% or 2%. Such molding compositions will then have the property of not adhering or sticking to dies, and will also extrude through extrusion dies and eject into injection dies with greater ease. Films laid down from coating compositions containing these plasticizers can be easily stripped from the surfaces on which they are deposited. Surfaces such as dies may be coated with these lubricants instead of incorporating the lubricants in the compositions themselves.

The following examples are intended as illustrative only, and should not be so construed as to limit the invention as to scope or proportions. Parts are by weight.

*Example 1. Mixed esters and processes for preparation thereof.*—Partial esters of pentaerythritol are made by heating one molecular proportion of pentaerythritol with from one to three molecular proportions of a higher fatty acid. The remaining hydroxyl group is then esterified by heating the partial ester with a sufficient quantity of an acid anhydride to complete the esterification, or they can first be etherified by reacting with an excess of ethylene oxide, and the newly formed hydroxyl groups esterified with an excess of an acid anhydride. The following table illustrates products made in accordance with these two methods:

Table I

| Compound | Calculated Mol Weight | Starting Hydroxy Ester | Physical Properties |
|---|---|---|---|
| Pentaerythritol triacetate monostearate | 528 | Pentaerythritol monostearate | M. P. 36-38° C. |
| Pentaerythritol tripropionate monomyristate | 514 | Pentaerythritol monomyristate | Soft Wax. |
| Pentaerythritol "technical" triacetate monostearate | | Pentaerythritol "technical" monostearate | Waxy solid. |
| Pentaerythritol "technical" tripropionate monomyristate | | Pentaerythritol "technical" monomyristate | Oil. |
| Pentaerythritol monocaprate tris-(ethylene glycol ether acetate) | 530 | Pentaerythritol tris-(ethylene glycol ether) | Do. |

The pentaerythritol, (technical) which is referred to herein consisted of 85% pentaerythritol and 15% dipentaerythritol.

*Example 2. Ester-acetals and ester-ketals and process for preparation thereof.*—The mono- and di-substituted hydroxy esters, such as pentaerythritol monostearate, form, when heated with an equimolar quantity of an aldehyde or ketone, ester cyclic acetals or ketals by elimination of one molecular equivalent of water. These ester-acetals and ester-ketals are best made by heating the hydroxy ester with the aldehyde or ketone in the presence of toluene or xylene to remove the water. The reaction is catalyzed by the presence of sulfuric acid in amounts ranging from $\frac{1}{10}$ to ½% of the total weight of reactants. Examples of compounds made by this process are: pentaerythritol monostearate benzal, pentaerythritol monoacetate formal, pentaerythritol diacetate formal, and dipentaerythritol hydroxy acetate formal.

*Example 3. Plasticizing results.*—In the following table are listed the compatibilities of the specified plasticizers with a variety of film-forming materials. The symbols used have the following significance:

C=compatible.
10, 25, or 67=Approximate maximum per cent of plasticizer which can be used to provide a satisfactory film.
I=incompatible.
T=compatible, but film was tacky.

*Film-former*

| | Pentaerythritol monostearate triacetate | Pentaerythritol monostearate benzal | Pentaerythritol tripropionate monomyristate |
|---|---|---|---|
| Cellulose nitrate | C.25 | C.25 | C.67 |
| Cellulose acetate | I | I | I |
| Cellulose acetobutyrate | C.10 | C.25 | C.67 |
| Ethyl cellulose | I | C.10 | C.67 |
| Chlorinated rubber | C.25 | C.25 | C.67 |
| Polyvinyl acetate | I | I | I |
| Polyvinyl acetal | I | I | I |
| Polystyrene | I | I | C.25 |
| Urea-butanol-formaldehyde resin | I | C.10 | |

The film prepared from polystyrene plasticized with 67% pentaerythritol diacetate dipropionate was nontacky but was very rubber-like in character, having a great "nerve" or elasticity.

*Example 4. Cellulose actetate molding composition.*—One hundred fifty (150) parts of dry cellulose acetate, 60 parts of acetone and 37.5 parts of technical pentaerythritol diacetate dipropionate were placed in a Banbury mixer and mixed with cooling for three minutes. At this time the cellulose acetate had become pasty. The cooling water was turned off, and the mixture was allowed to heat up from the internal friction of further mixing. As soon as the acetone had started to boil off, the Banbury mixer was further heated by circulating steam at normal atmospheric pressure in the jacket. When the acetone had been substantially all removed, the Banbury mixer was again cooled with continued mixing, whereupon a dense, granular molding composition was obtained.

This molding composition was placed in a test extrusion die having an orifice 3 mm. in diameter and 26 mm. in length. The test die was placed in a hydraulic press and subjected to a platen temperature of 175° C. and a total pressure of 15 tons. After five minutes a total of only 0.26 gram had been extruded, and after thirty minutes the total amount extruded was still the same.

This entire procedure was repeated, adding three parts of pentaerythritol triacetate monostearate to the molding composition along with the pentaerythritol diacetate dipropionate. In this case, after five minutes, 0.59 gram had extruded, and after thirty minutes a total of 7.80 grams had extruded. The extruded products were clear and showed no signs of incompatibility. This demonstrates the ability of a pentaerythritol mixed ester of a long-chain fatty acid and short-chain fatty acid to lubricate molding compositions.

The versatility and wide applicability of the esters of pentaerythritol and of polypentaerythritols is evidenced in the foregoing examples. Many modifications of these esters are possible, and the various permutations and combinations of esters may easily be arranged to fill a specific need by one skilled in the art, by following the general and specific methods given.

Having thus described our invention, what we claim as new and desire to secure by Letters Patent is:

1. A mixed ester of a polyhydric alcohol selected from the group consisting of pentaerythritol and polypentaerythritols in which all of the hyroxyl radicals of the polyhydric alcohol have been esterified, at least one of said hydroxyl radicals by a long-chain acyclic saturated carboxylic acid having at least 10 carbon atoms in the molecule and the remaining hydroxyl radicals by an acyclic saturated carboxylic acid having fewer than 5 carbon atoms in the molecule.

2. A mixture of mixed esters of pentaerythritol and a polypentaerythritol, in which all of the hydroxyl radicals of each of the polyhydric alcohols have been esterified, at least one of said hydroxyl radicals of each of said polyhydric alcohols by a long-chain acyclic saturated carboxylic acid having at least 10 carbon atoms in the molecule and the remaining hydroxyl radicals of each of said polyhydric alcohols by an acyclic saturated carboxylic acid having fewer than 5 carbon atoms in the molecule.

3. A mixed ester of pentaerythritol in which all of the hydroxyl radicals of pentaerythritol have been esterified, at least one of said hydroxyl radicals by a long-chain acyclic saturated carboxylic acid having at least 10 carbon atoms in the molecule and the remaining hydroxyl radicals by an acyclic saturated carboxylic acid having fewer than 5 carbon atoms in the molecule.

4. A mixed ester of a polyhydric alcohol selected from the group consisting of pentaerythritol and polypentaerythritols in which all of the hydroxyl radicals of the polyhydric alcohol have been esterified, at least one of said hydroxyl radicals by stearic acid and the remaining hydroxyl radicals by acetic acid.

5. A mixed ester of a polyhydric alcohol selected from the group consisting of pentaerythritol and polypentaerythritols in which all of the hydroxyl radicals of the polyhydric alcohol have been esterified, at least one of said hydroxyl radicals by myristic acid and the remaining hydroxyl radicals by propionic acid.

6. A mixed ester of a polyhydric alcohol selected from the group consisting of pentaerythritol and polypentaerythritols in which all of the hydroxyl radicals of the polyhydric alcohol have been esterified, at least one of said hydroxyl radicals by lauric acid and the remaining hydroxyl radicals by acetic acid.

7. Pentaerythritol triacetate monostearate, which when substantially pure has a melting point of approximately 36–38° C.

8. Pentaerythritol tripropionate monomyristate, which when substantially pure is a soft waxy substance.

9. Pentaerythritol triacetate monolaurate.

ROBERT H. BARTH.
HARRY BURRELL.

REFERENCES CITED

The following references are of record in the file of this patent:

UNITED STATES PATENTS

| Number | Name | Date |
|---|---|---|
| 1,558,299 | Schwartz | Oct. 20, 1925 |
| 2,029,851 | Arvin | Feb. 4, 1936 |
| 2,032,091 | Holt | Feb. 25, 1936 |
| 2,040,937 | Haugh | May 19, 1936 |
| 2,077,371 | Rheineck | Apr. 13, 1937 |
| 2,091,988 | Hubbuch | Sept. 7, 1937 |